United States Patent
Su et al.

(10) Patent No.: US 6,961,582 B2
(45) Date of Patent: Nov. 1, 2005

(54) TRANSMISSION POWER CONTROL METHOD AND SYSTEM FOR CDMA COMMUNICATION SYSTEM

(75) Inventors: Szu Lin Su, Tainan (TW); Yu Che Su, Tainan (TW)

(73) Assignee: Accton Technology Corporation, Hsinchu (TW)

(*) Notice: Subject to any disclaimer, the term of this patent is extended or adjusted under 35 U.S.C. 154(b) by 423 days.

(21) Appl. No.: 10/073,183

(22) Filed: Feb. 13, 2002

(65) Prior Publication Data

US 2003/0153344 A1 Aug. 14, 2003

(51) Int. Cl.[7] ............................................. H04B 7/00
(52) U.S. Cl. .................... 455/522; 455/69; 455/70; 455/13.4
(58) Field of Search .................... 455/522, 69, 70, 455/13.4, 445, 442; 370/342

(56) References Cited

U.S. PATENT DOCUMENTS

| | | | |
|---|---|---|---|
| 6,216,010 B1 | | 4/2001 | Edwards |
| 6,307,844 B1 | | 10/2001 | Tsunehara |
| 6,718,180 B1 | * | 4/2004 | Lundh et al. ............... 455/522 |
| 2001/0053670 A1 | * | 12/2001 | Voyer ......................... 455/69 |
| 2002/0173309 A1 | * | 11/2002 | Shahidi et al. ............... 455/442 |
| 2002/0181550 A1 | * | 12/2002 | Zeira et al. .................. 375/146 |

OTHER PUBLICATIONS

Qiang Wu, Member, IEEE, Optimum Transmitter Power Control in Cellular Systems with Heterogenons SIR Thresholds.

* cited by examiner

Primary Examiner—Nick Corsaro
Assistant Examiner—Alan Gantt

(57) ABSTRACT

A transmission power control method for a CDMA communication system which performs communication between a basestation and a plurality of mobile stations; comprising the steps of: transmitting uplink power from the plurality of the mobile stations to the basestation; measuring and receiving the uplink power transmitted from each of the plurality of mobile stations with different signal-to-interference (SIR) requirement thresholds at the basestation; taking a algorithm to converge the transmitted uplink power from each of the plurality of mobile stations; and calculating the uplink power transmitted from each of the plurality of mobile stations by a power convergence factor. The transmission power control method only needs the local measurements at the basestation and can meet different SIR requirements of mobile stations based on fair principle. Additionally, the transmission power control method of the present invention can not only converge fast, but also keep the transmitted power in a reasonable range.

24 Claims, 6 Drawing Sheets

TRANSMISSION POWER CONTROL METHOD AND SYSTEM FOR CDMA COMMUNICATION SYSTEM

BACKGROUND OF THE INVENTION

1. Field of the Invention

The present invention generally relates to a code division multiple access (CDMA) system, and more particularly to a multimedia direct-sequence code division multiple access (DS-CDMA) system which utilizes fully distributed uplink power control method.

2. Description of the Related Art

In a CDMA system, a plurality of mobile terminals share the same frequency band to communicate with a single basestation. Therefore, for example, if mobile terminals A and B transmit modulated signal waves to the basestation, the signal (not desired to be received) transmitted by the mobile terminal B interferes with the signal (desired to be received) transmitted by the mobile terminal A, and the communication of the mobile terminal A with the basestation is obstructed. The degree of interference depends on the received level of a signal (not desired to be received) at the basestation. If the degree of interference becomes large to certain level or more, communication between the mobile terminal and basestation becomes impossible.

If the transmission power of each mobile terminal can be controlled to always limit the signal level received at the basestation to a minimum necessary reception power, it becomes possible to maximize the number of channels capable of being communicated by the basestation. The more the transmission power shifts from the minimum necessary reception power, the less the number of channels capable of being communicated by the basestation.

As to transmission power control techniques of CDMA mobile communication, an IS-95 transmission power control method is known and described in TIA/EIA/IS-95 which is a standard system of digital cellular phones adopted in North America. The IS-95 transmission power control method will be described as follows.

Since two-way communication is essential for cellular phones system, a pair of an uplink traffic channel and a downlink traffic channel are used for the communication between the basestation and a mobile terminal. The uplink traffic channel is a channel for transmitting data from a mobile terminal to the basestation, and a downlink traffic channel is a channel for transmitting data from the basestation to the mobile terminal.

Referring to FIG. 1, it shows the structure of a mobile communication network. A public switched telephone network (PSTN) 200 is connected to a fixed terminal 201 such as a telephone and a mobile communication network 202. The mobile communication network 202 is connected to a plurality of basestations 203a, 203b, . . . Each basestation 203 communicates with mobile terminals 204a, 204b, . . . in its service area (cell) via radio channels 205.

Referring to FIG. 2, it graphically illustrates a CDMA-based communication system comprising a mobile station 10, a basestation 20, an uplink (reverse link) 30 which represents the electromagnetic wave communication link transmitted from mobile station 10 to basestation 20 and downlink (forward link) 40 which represents the electromagnetic wave communication link transmitted from basestation 20 to mobile station 10.

One method to control the level of interference in a CDMA-based communication system is by way of power control, that is, the power transmitted from the mobile station 10 to the basestation 20 (uplink, reverse link) or from the basestation 20 to the mobile station 10 (downlink, forward link) is controlled or varied. Power control on the uplink (reverse link) is required because of the so-called "near/far" problem. The problem occurs when a mobile station close to a basestation undergoes or incurs relatively low power propagation loss, and thus the basestation sees a very high level of power from the mobile station, whereas a mobile station located farther out undergoes relatively high propagation loss, and thus the power received by the basestation from the mobile station is very low. Power control for the reverse link is thus used to command the nearby and far-out mobile stations to reduce or increase the transmit power to the basestation, as is well known in the art.

U.S. Pat. No. 6,216,010 issued to Edwards et al., entitled "Up-link power control for fixed wireless access", discloses that up-link power control for fixed wireless access communication networks. In the invention, a radio communications uplink power control system wherein distance information between an outstation and a base station and information relating to channel loss is employed by a power control algorithm whereby the signal power transmitted can be optimally controlled. The present invention provides a power control strategy which adapts not only to the total channel loss, but separately to the components of this loss. The total channel loss is calculated from the difference in the received signal power and the transmitted signal power (which is encoded in the message, or sent in addition to the message and therefore known to the receiving station).

U.S. Pat. No. 6,307,844 issued to Tsunehara et al., entitled "CDMA Communication System and Its Transmission Power Control Method", discloses that an uplink channel transmission power control method for a CDMA mobile communication system performing one way communication. A base station measures the received level of data transmitted from each mobile terminal at each channel, and generates a transmission power control signal of each uplink traffic channel. The generated transmission power control signals are multiplexed, and the multiplexed common transmission power control signal is transmitted to all mobile terminals by using the common channel shared by the mobile terminals. Each mobile terminal derives the transmission power control signal of the uplink traffic channel used by the terminal, from the received common transmission power control signal, and controls the transmission power of a data packet.

In addition, power control schemes can be centralized or distributed depending on the nature of control. The basestation has the full knowledge of link gains for the centralized control to decide the power adjustment of each individual mobile station, but has only the local information of received power (signal-to-interference, SIR, for example) for distributed mechanism. Most literature investigated the distributed power control methods for FDMA/TDMA systems has focused on the study of the convergence speed of power control process under the assumption of same required SIR threshold for all mobile stations.

Paper issued by Qiang Wu, entitled "Optimum Transmitter Power Control in Cellular Systems with Heterogeneous SIR Thresholds", *IEEE Trans. On Vehicular Technology*, pp. 1424–1429, Vol. 49, No. 4, July 2000. Qiang Wu first proposed a way which is extended from his results to determine the feasible solution of centralized power control for the CDMA systems, and he further proposed a distributed power control algorithm for the multimedia DS-CDMA system with different SIR requirement thresholds.

For the multimedia DS-CDMA systems with different SIR requirement threshold, the power adjustment formula of the distributed power control algorithm proposed in Wu reference is:

$$P_i^{(n+1)} = c^n \frac{\beta_i}{\gamma_i^{(n)}} P_i^{(n)}$$

where $$P_i^{(n)}$$

is the transmitted power of mobile station i at the nth iteration, $\beta_i$ is the minimum SIR requirement threshold at the basestation for mobile station i, $$\gamma_i^{(n)}$$

is the received SIR of mobile station i at the nth iteration, $c^{(n)}$ is the power convergence factor and $$\frac{1}{c^{(n)}} = P_{max}^{(n)}$$

is the maximum transmitted power of mobile stations in all the cells at the nth iteration. At each iteration, mobile station i shall adjust its power by $$c^{(n)} \frac{\beta_i}{\gamma_i^{(n)}}$$

which value is informed by the basestation. From the numerical results, it is shown that the received SIR can converge by such algorithm. However, there is a drawback in such algorithm. It is impractical for the basestation to get the value of $$P_{max}^{(n)}$$

max unless it is informed via uplink signaling and exchanged among all cells.

However, to carry out the power control process proposed in past, the basestation needs to know the maximum transmitted power of all the mobile stations in all cells and it is not practical for distributed system.

Accordingly, there exist the needs for providing a transmission power control method for a CDMA communication system which only needs the local measurements at the basestation and meets different SIR requirements of mobile stations based on fair principle.

SUMMARY OF THE INVENTION

It is a primary object of the present invention to provide a transmission power control method and system for a CDMA communication system, especially for multimedia DS-CDMA systems, which only needs the local measurements at the basestation and meets different SIR requirements of mobile stations based on fair principle.

It is another object of the present invention to provide a transmission power control method and system for a CDMA communication system, especially for multimedia DS-CDMA systems, wherein the power control method can not only converge fast, but also keep the transmitted power in a reasonable range.

In order to achieve the above objects, the present invention provides a transmission power control method for a CDMA communication system, especially for multimedia DS-CDMA communication system. The CDMA communication system performs communication between a basestation and a plurality of mobile stations. The transmission power control method according to the present invention comprises the following steps. First, the plurality of the mobile stations transmit an uplink power to the basestation. Second, the basestation receives and measures the uplink power transmitted from each of the plurality of mobile stations with a received SIR and a SIR requirement threshold. Third, a mean at the basestation will take an iterative algorithm to get a convergent transmitted power. The iterative algorithm means that a (n+1) transmitted power of the mobile station i equals a convergence factor multiplied with a (n) transmitted power of the mobile station i, wherein the convergence factor at the nth iteration equals a power convergence factor $c^{(n)}$ at the nth iteration over a determined factor $\rho^{(n)}$ at the nth iteration and the determined factor $\rho^{(n)}$ equals the received SIR of mobile station i at the nth iteration $$\gamma_i^{(n)}$$

over the SIR requirement threshold at the basestation for mobile station i $\beta_i$.

According to one aspect of the transmission power control method of the present invention, wherein the iterative algorithm at the nth iteration further chooses the power convergence factor $c^{(n)}$ at the nth iteration similar to the determined factor $\rho^{(n)}$ at the nth iteration, i.e.

$$c^{(n)} \approx \rho_i^{(n)} = \left(\frac{\gamma_i^{(n)}}{\beta_i}\right).$$

According to one aspect of the transmission power control method of the present invention, wherein the power convergence factor is determined from a local information of the received SIR and the SIR requirement threshold in a target cell, i.e., the maximum value of $$\left(\frac{\gamma_j^{(n)}}{\beta_j}\right)$$

of all the mobile stations in the target cell, the minimum value of $$\left(\frac{\gamma_j^{(n)}}{\beta_j}\right)$$

of all the mobile stations in the target cell or the average value of $$\left(\frac{\gamma_j^{(n)}}{\beta_j}\right)$$

of all the mobile stations in the target cell.

One advantage of the transmission power control method in the present invention is that it only needs the local measurements at the basestation, and thus it can meet different SIR requirements of mobile stations based on fair principle.

Another advantage of the transmission power control method in the present invention is that it can not only converge fast, but also keep the transmitted power in a reasonable range.

Other objects, advantages, and novel features of the invention will become more apparent from the following detailed description when taken in conjunction with the accompanying drawing.

DESCRIPTION OF THE PREFERRED EMBODIMENT

Figure 1:
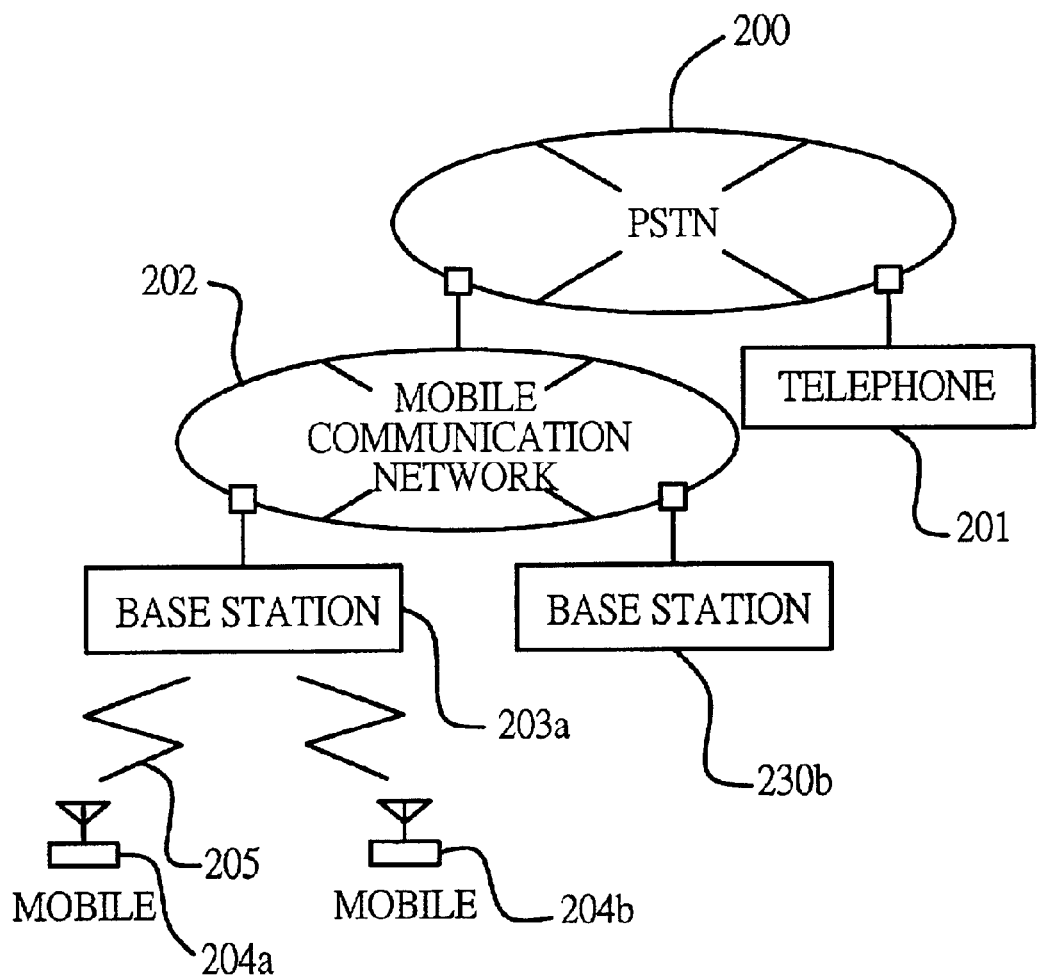
FIG. 1 is a diagram showing the structure of a mobile communication network.
Figure 2:
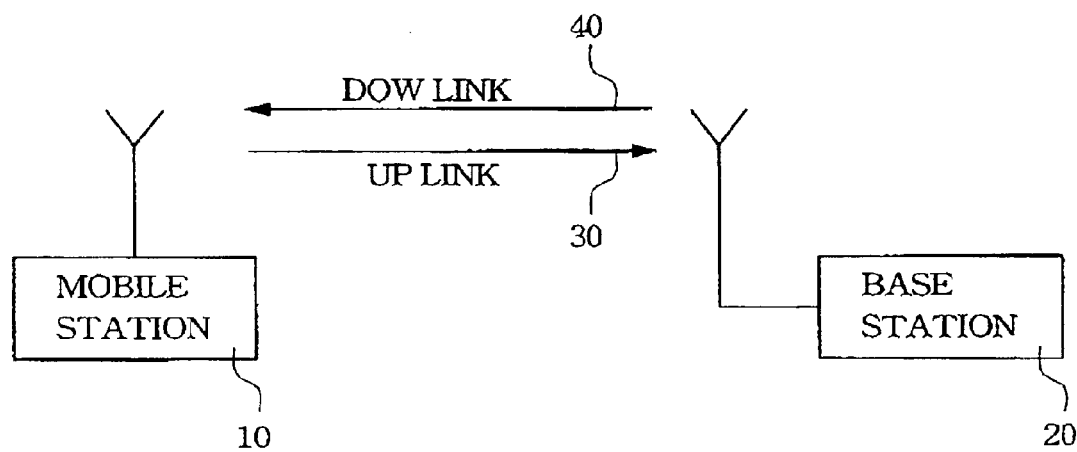
FIG. 2 is a prior art graphical representation of a CDMA mobile communication system.
Figure 3A:
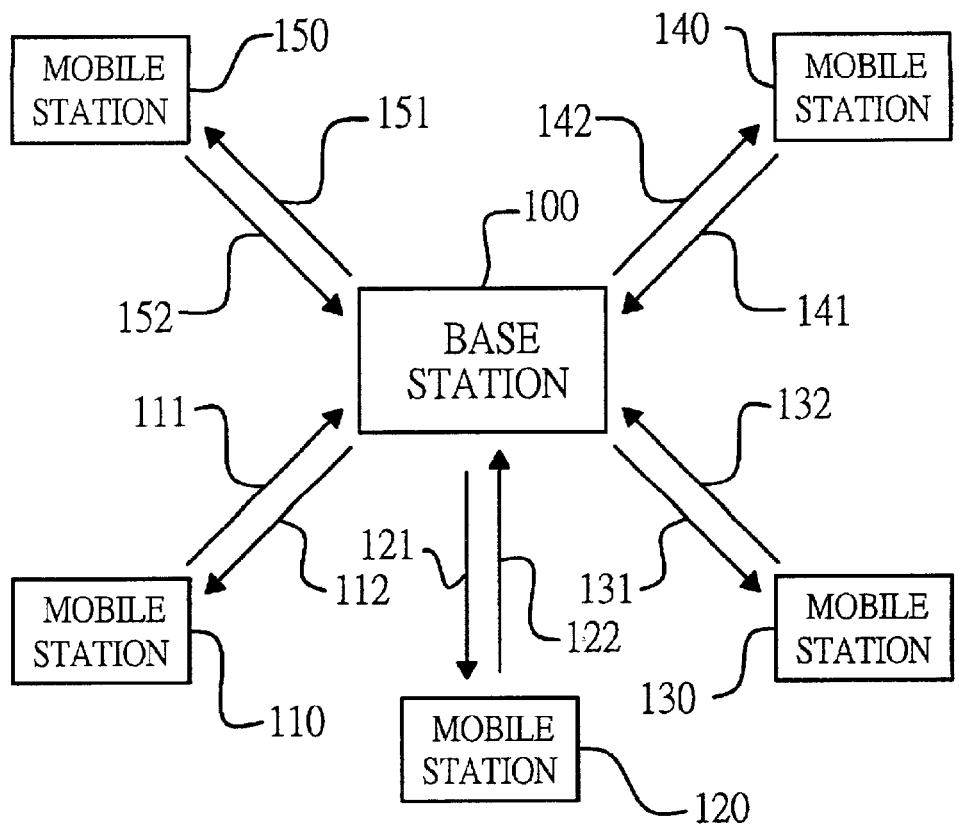
FIG. 3a is a diagram showing a CDMA mobile communication system of according to the embodiment of the present invention.

FIG. 3a is a diagram showing a CDMA mobile communication system according to the embodiment of the present invention.

FIG. 3a show a plurality of mobile stations 110, 120, 130, 140 and 150 along with an exemplary basestation 100, which includes a cellular telephone, are illustrated. It is noted there will be N mobile stations in the system. Here mobile station i ($1 \leq i \leq N$) defines the arbitrary mobile station. Arrows 111–112 define the possible communication link between basestation 100 and mobile station 110. Similarly, arrows 121–122, 131–132, 141–142, and 151–152 define the possible communication link between basestation 100 and mobile station 120, 130, 140 and 150, respectively. The mobile stations 110, 120, 130, . . . 150, transmit the uplink power to the basestation 100. The basestation 100 measures and receives the power transmitted from each of the plurality of mobile stations with different SIR requirement thresholds. The basestation 100 takes a algorithm to converge the transmitted power from each of the plurality of mobile stations, and calculates and adjusts the power transmitted from each of the plurality of mobile stations by a power convergence factor. The received SIR from mobile station i at the target basestation 1 is $$\gamma_i^{(n)} = \frac{G_{i,1} P_i^{(n)}}{\sum_{j \neq i}^{M} G_{j,1} P_j^{(n)} (1+\xi)}$$

where $G_{j,1}$ is the channel gain from mobile station j to basestation 1, $\xi$ is the other cell interference factor, and M is the number of mobile stations in the cell. It is noted that whether $\beta_i$ is feasible ($\lim_{n \to \infty} \gamma_i^{(n)} \geq \beta_i$) or not is strongly dependent on the received power from other stations (i.e., $G_{j,1} P_j^{(n)}$ or required $\beta_j$, for $j \neq i$) and the value of M. Since $\gamma_i^{(n)} \neq \beta_i$ in most cases, under the rule of fairness it is reasonable to request $$\gamma_i^{(n)} = \rho_i^{(n)} \cdot \beta_i$$

and $$\lim_{n \to \infty} \rho_i^{(n)} = \rho$$

for all i. It means that all SIR requirements $\{\beta i\}$ are feasible when $\rho \geq 1$. But, on the other hand, if $\rho < 1$ and the performance degradation is not allowable, removal methods should be performed.

From above discussion, we can get an iterative algorithm to get a convergent transmitted power, $$P_i^{(n+1)} = \left(\frac{c^{(n)}}{\rho_i^{(n)}}\right) P_i^{(n)} = \prod_{j=0}^{n}\left(\frac{c^{(j)}}{\rho_i^{(j)}}\right) P_i^{(0)}$$

In order to get a convergent transmitted power, it seems a good idea to choose $$c^{(n)} \approx \rho_i^{(n)} = \left(\frac{\gamma_j^{(n)}}{\beta_j}\right).$$

Therefore, three methods according to the embodiment of the present invention are proposed as followings:

1. The first methods uses local maximum factor
Set $$c^{(n)} = \left(\frac{\gamma_j^{(n)}}{\beta_j}\right)_{\max},$$

the maximum value of $$\left(\frac{\gamma_j^{(n)}}{\beta_j}\right)$$

of all the mobile stations in the target cell.

2 The second methods uses local minimum factor
Set $$c^{(n)} = \left(\frac{\gamma_j^{(n)}}{\beta_j}\right)_{\min},$$

the minimum value of $$\left(\frac{\gamma_j^{(n)}}{\beta_j}\right)$$

of all the mobile stations in the target cell.

3 The third methods uses local average factor
Set $$c^{(n)} = \left(\frac{\gamma_j^{(n)}}{\beta_j}\right)_{avg},$$

the average value of $$\left(\frac{\gamma_j^{(n)}}{\beta_j}\right)$$

of all the mobile stations in the target cell.

Figure 3B:
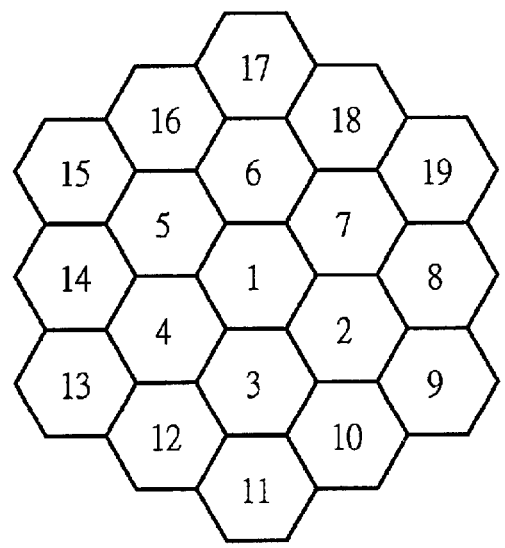
FIG. 3b is a diagram showing a CDMA mobile communication system of 19 cells in the present invention.

Referring to FIG. 3b, it is a diagram showing a CDMA mobile system of 19 cells in the present invention. The central cell which is surrounded by the other 18 cells in a hexagonal-grid configuration is the target cell. It is assumed that there are M mobile stations uniformly distributed in each cell with different SIR requirement thresholds {βi}= {−15, −14, . . . , −15+(M−1)}dB. Every mobile station's initial transmitted power is randomly distributed over a 30 dB range. Note that the value is just a ratio and the actual transmitted power, which is determined by the system, is not concerned in the present invention.

The large-scale fading propagation model is considered in the uplink (reverse link) in the present invention. By experience, the large-scale fading gain L(t) is usually modeled as $$L(t) = k \cdot \gamma^{-\alpha} 10^{\frac{\eta}{10}}$$

where k is a constant, r is the distance, α is the path loss exponent, and η is a normal-distributed random variable having zero mean and variance $\sigma_L^2$. We adopt α=4 and $\sigma_L$=8 in the simulation. This large-scale fading gain is assumed to be fixed for any particular mobile during the simulation cycle but it is variant for each mobile station.

Figure 4:
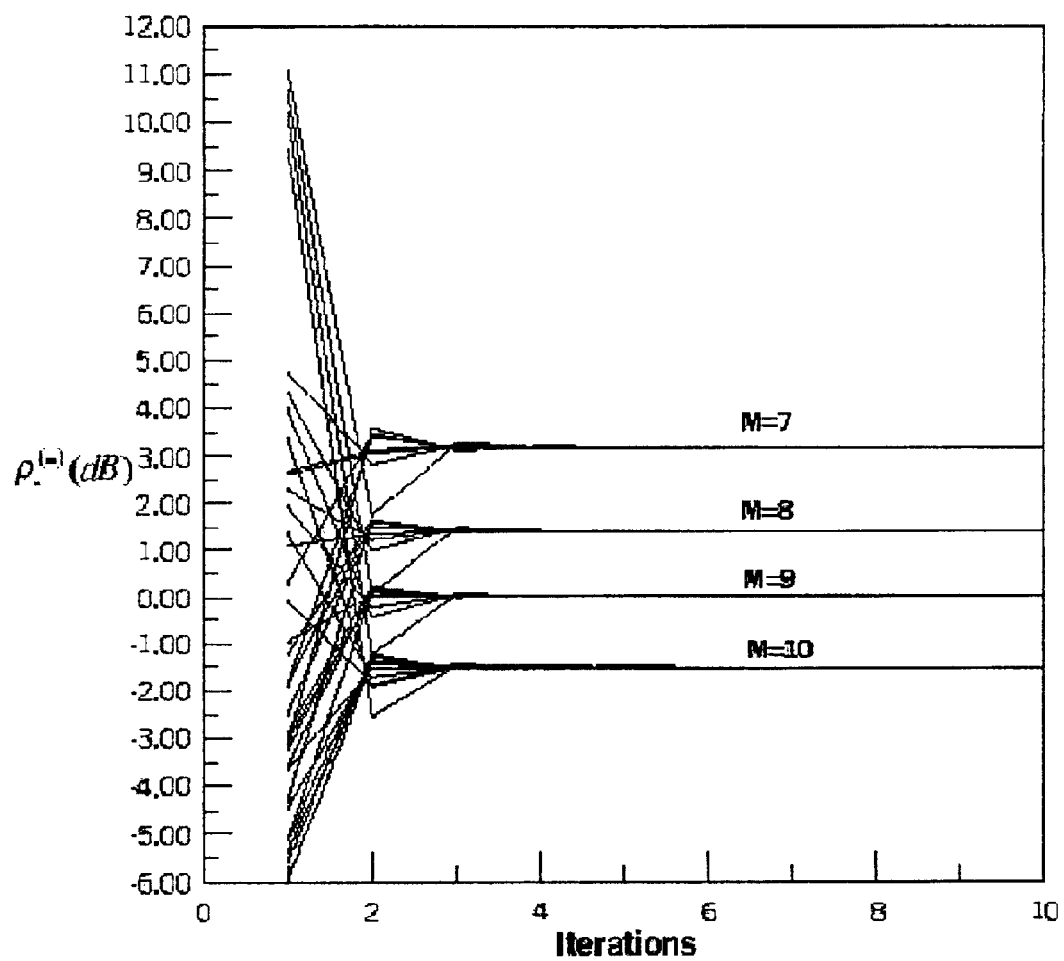
FIG. 4 shows the convergent speed of $\rho^{(n)}$ for different values of M using local maximum, minimum, or average factors according to the present invention.

Referring to FIG. 4, it shows the convergent speed of $\rho^{(n)}$ for different values of M using local maximum, minimum, or average factors according to the present invention. Note that, since the power convergence factor will not affect received SIR, we can get the same curves for the proposed methods. From this FIG., it is seen that $\rho^{(n)}$ is converged in less than 5 iteration steps and the system performance (SIR) requirements are not feasible when M>9.

Figure 5:
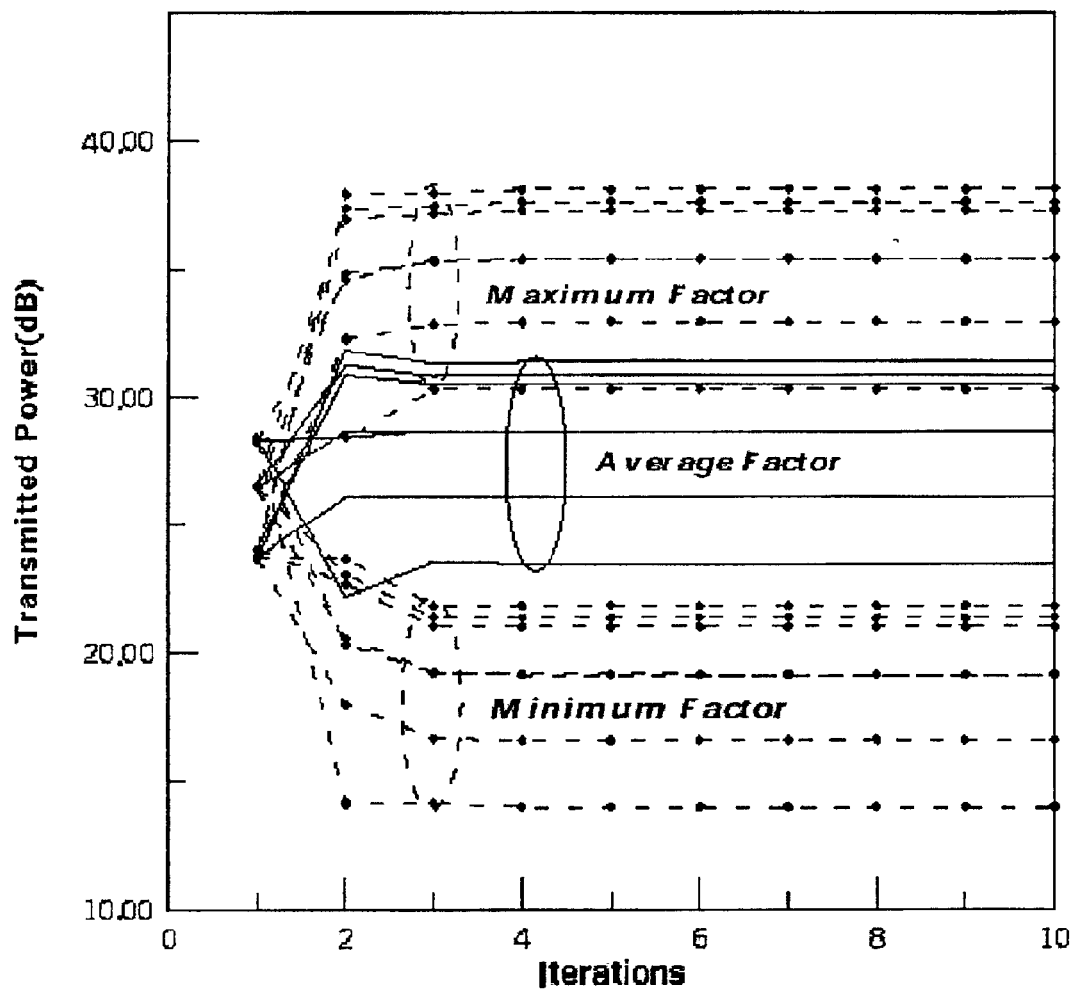
FIG. 5 show the variation of transmitted power levels by using different power convergent factors for M=7 according to the present invention.
Figure 6:
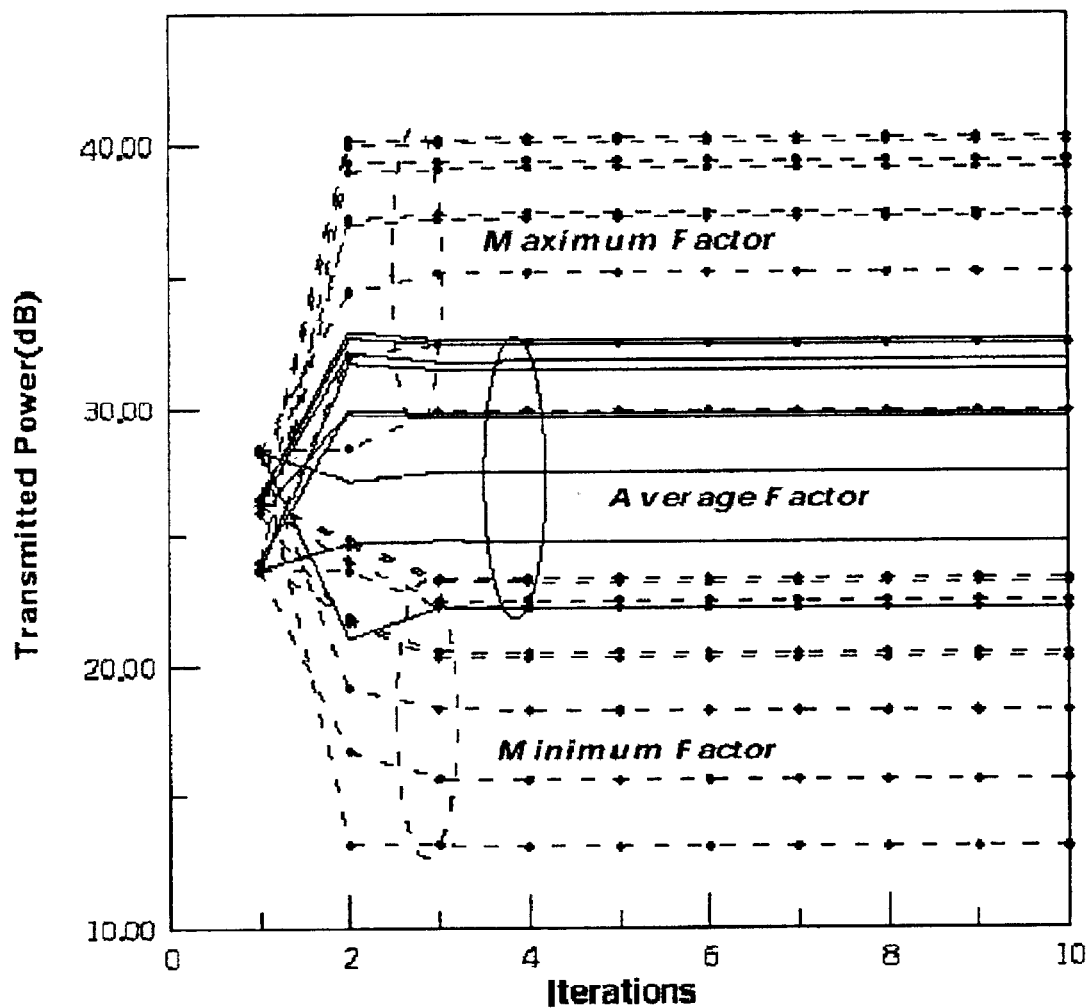
FIG. 6 show the variation of transmitted power levels by using different power convergent factors for M=9 according to the present invention.

Referring to FIGS. 5 and 6, they show the variation of transmitted power levels by using different power convergent factors for M=7 and 9 according to the present invention. The setting of power convergent factor will certainly have impact on the range of transmitted power. Although all three proposed power convergent factors can provide almost the same performance on convergent speed, it is clear that the use of local maximum factor will give a mono-increasing trend on transmitted power and the use of local minimum factor will give a mono-decreasing trend on transmitted power. It is seen that the transmitted power levels for the case of local average factor are located in the middle of the other two.

Although there is no unit (W, mW, or . . . ) specified for the transmitted power levels (It means that we can randomly pick any unit for it.), the steady-state transmitted power levels which are close to the initial transmitted power levels are preferred because it will reduce the requirement of dynamic range of the mobile stations' transmitted power. Hence the algorithm using local average factor shall be the better one from this point of view.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A transmission power control method for a CDMA communication system which performs communication between a basestation and a plurality of mobile stations; the transmission power control method comprising the steps of:

receiving and measuring an uplink power transmitted from each of the plurality of mobile stations with a received SIR and a SIR requirement threshold at the basestation; and taking an iterative algorithm to get a convergent transmitted power;

wherein (i) the iterative algorithm expresses that a (n+1)th transmitted power of the mobile station i equals a convergence factor multiplied with a (n)th transmitted power of the mobile station i, (ii) the convergence factor at the nth iteration equals a power convergence factor $c^{(n)}$ at the nth iteration over a determined factor ($\rho^{(n)}$ at the nth iteration. (iii) the determined factor ($\rho^{(n)}$) equals the received SIR of mobile station i at the nth iteration $$(\gamma_i^{(n)})$$

over the SIR requirement threshold at the basestation for mobile station and (iv) the iterative algorithm at the nth iteration further chooses the power convergence factor ($c^{(n)}$) at the nth iteration similar to the determined factor ($\rho^{(n)}$) at the nth iteration, i.e.

$$c^{(n)} \approx \rho_i^{(n)} = \left(\frac{\gamma_i^{(n)}}{\beta_i}\right).$$

2. A transmission power control method according to claim 1, wherein the power convergence factor is determined from the local information of the received SIR and the SIR requirement threshold in a target cell.

3. A transmission power control method according to claim 2, wherein the power convergence factor is the maximum value of $$\left(\frac{\gamma_j^{(n)}}{\beta_j}\right)$$

of all the mobile stations in the target cell.

4. A transmission power control method according to claim 2, wherein the power convergence factor is the minimum value of $$\left(\frac{\gamma_j^{(n)}}{\beta_j}\right)$$

of all the mobile stations in the target cell.

5. A transmission power control method according to claim 2, wherein the power convergence factor is the average value of $$\left(\frac{\gamma_j^{(n)}}{\beta_j}\right)$$

of all the mobile stations in the target cell.

6. A transmission power control method according to claim 1, wherein the algorithm is simulated under conditions of:
   assuming that there are M mobile stations uniformly distributed in each cell with different SIR requirement thresholds; and
   applying the large-scale fading propagation model in the uplink.

7. A transmission power control method according to claim 6, wherein the large-scale fading propagation model is assumed to be fixed for any particular mobile during the calculating cycle but it is variant for each mobile use.

8. A transmission power control method according to claim 1, wherein the CDMA communication system is a direct-sequence CDMA communication system.

9. A system to achieving a transmission power control for a CDMA communication system which performs communication between a basestation and a plurality of mobile stations; the system comprising:
   means for receiving and measuring the uplink power transmitted from each of the plurality of mobile stations with a received SIR and a SIR requirement threshold at the basestation; and
   means for taking an iterative algorithm to get a convergent transmitted power;
   wherein (i) the iterative algorithm means that a (n+1) transmitted power of the mobile station i equals a converaence factor multiplied with a (n) transmitted power of the mobile station i, (ii) the convergence factor at the nth iteration equals a power convergence factor $C^{(n)}$ at the nth iteration over a determined factor ($\rho^{(n)}$) at the nth iteration, (iii) the determined factor ($\rho^{(n)}$) equals the received SIR of mobile station i at the nth iteration $$(\gamma_i^{(n)})$$

over the SIR requirement threshold at the basestation for mobile station i ($\beta_i$), and (iv) the iterative algorithm at the nth iteration further chooses the power convergence factor ($c^{(n)}$) at the nth iteration similar to the determined factor ($\rho^{(n)}$) at the nth iteration, i.e.

$$c^{(n)} \approx \rho_i^{(n)} = \left(\frac{\gamma_i^{(n)}}{\beta_i}\right).$$

10. A system according to claim 9, wherein the power convergence factor is determined from a local information of the received SIR and the SIR requirement threshold in a target cell.

11. A system according to claim 10, wherein the power convergence factor is the maximum value of $$\left(\frac{\gamma_j^{(n)}}{\beta_j}\right)$$

of all the mobile stations in the target cell.

12. A system according to claim 10, wherein the power convergence factor is the minimum value of $$\left(\frac{\gamma_j^{(n)}}{\beta_j}\right)$$

of all the mobile stations in the target cell.

13. A system according to claim 10, wherein the power convergence factor is the average value of $$\left(\frac{\gamma_j^{(n)}}{\beta_j}\right)$$

of all the mobile stations in the target cell.

14. A system according to claim 9, wherein the algorithm is simulated under conditions of:
   assuming that there are M mobile stations uniformly distributed in each cell with different SIR requirement thresholds; and
   applying the large-scale fading propagation model in the uplink.

15. A system according to claim 14, wherein the large-scale fading propagation model is assumed to be fixed for any particular mobile during the calculating cycle but it is variant for each mobile use.

16. A system according to claim 9, wherein the CDMA communication system is a direct-sequence CDMA communication system.

17. A basestation for communicating with a plurality of mobile terminals in a CDMA communication system. comprising:
   means for receiving and measuring an uplink power transmitted from each of the plurality of mobile stations with a received SIR and a SIR requirement thresholds at the basestation; and
   means for taking an iterative algorithm to get a convergent transmitted power;
   wherein (i) the iterative algorithm means that a (n+1) transmitted power of the mobile station i equals a convergence factor multiplied with a (n) transmitted power of the mobile station i, (ii) the convergence factor at the nth iteration equals a power convergence factor $c^{(n)}$ at the nth iteration over a determined factor ($\rho^{(n)}$) at the nth iteration, (iii) the determined factor $\rho^{(n)}$ equals the received SIR of mobile station i at the nth iteration $$\gamma_i^{(n)}$$

over the SIR requirement threshold at the basestation for mobile station i $\beta_i$ and (iv) the iterative algorithm at the nth iteration further chooses the power convergence factor $c^{(n)}$ at the nth iteration similar to the determined factor $\rho^{(n)}$ at the nth iteration, i.e.

$$c^{(n)} \approx \rho_i^{(n)} = \left(\frac{\gamma_i^{(n)}}{\beta_i}\right).$$

18. A basestation according to claim 17, wherein the power convergence factor is determined from a local information of the received SIR and the SIR requirement threshold in a target cell.

19. A basestation according to claim 18, wherein the power convergence factor is the maximum value of $$\left(\frac{\gamma_j^{(n)}}{\beta_j}\right)$$

of all the mobile stations in the target cell.

20. A basestation according to claim 18, wherein the power convergence factor is the minimum value of $$\left(\frac{\gamma_j^{(n)}}{\beta_j}\right)$$

of all the mobile stations in the target cell.

21. A system according to claim 18, wherein the power convergence factor is the average value of $$\left(\frac{\gamma_j^{(n)}}{\beta_j}\right)$$

of all the mobile stations in the target cell.

22. A basestation according to claim 17, wherein the algorithm is simulated under conditions of:

assuming that there are M mobile stations uniformly distributed in each cell with different SIR requirement thresholds;

applying the large-scale fading propagation model in the uplink.

23. A basestation according to claim 22, wherein the large-scale fading propagation model is assumed to be fixed for any particular mobile during the calculating cycle but it is variant for each mobile use.

24. A basestation according to claim 17, wherein the CDMA communication system is a direct-sequence CDMA communication system.

* * * * *